H. O. COSTELLO.
QUICK ADJUSTING MICROMETER.
APPLICATION FILED JAN. 9, 1908.
898,972.
Patented Sept. 15, 1908.
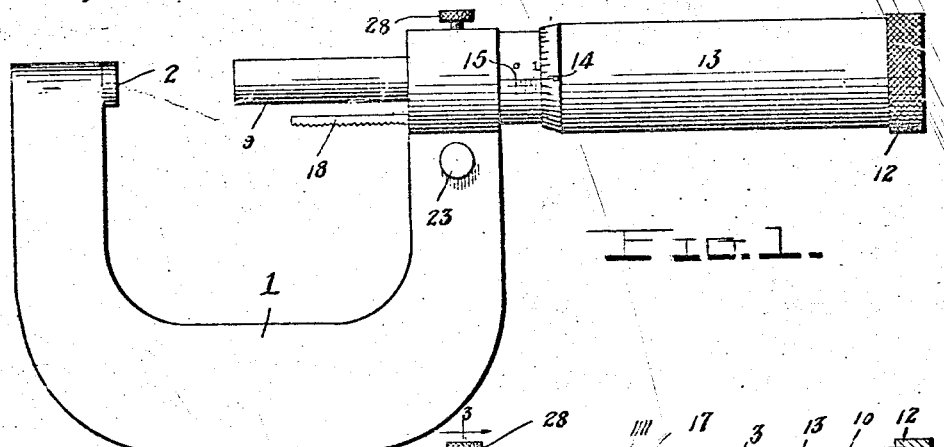
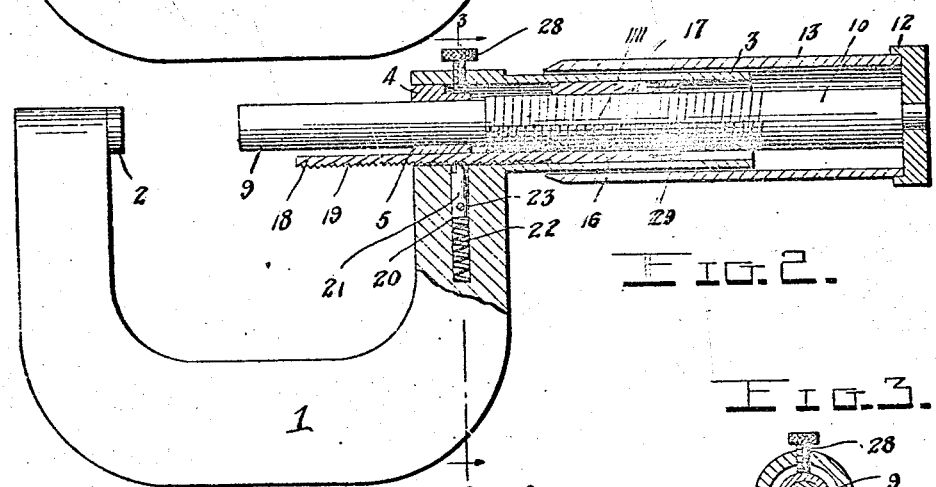
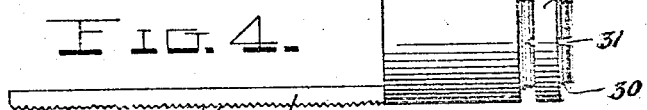
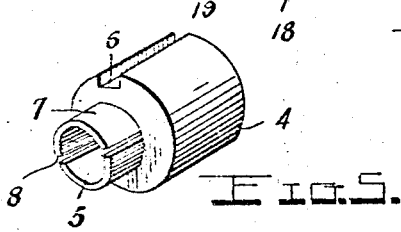
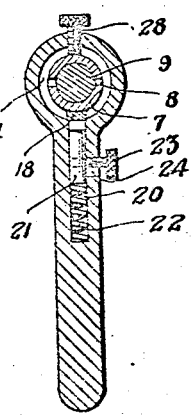
Inventor
Henry O. Costello.

UNITED STATES PATENT OFFICE.

HENRY OWEN COSTELLO, OF PROVIDENCE, RHODE ISLAND.

QUICK-ADJUSTING MICROMETER.

No. 898,972.  Specification of Letters Patent.  Patented Sept. 15, 1908.

Application filed January 9, 1908. Serial No. 409,994.

*To all whom it may concern:*

Be it known that I, HENRY OWEN COSTELLO, a citizen of the United States, residing at Providence, in the county of Providence and State of Rhode Island, have invented certain new and useful Improvements in Quick-Adjusting Micrometers; and I do declare the following to be a full, clear, and exact description of the invention, such as will enable others skilled in the art to which it appertains to make and use the same.

This invention relates to micrometer calipers, and has for its object to provide a micrometer which can be instantly opened or closed to any point within its capacity without impairing its accuracy or sensitiveness in the slightest degree.

Another object is to provide a micrometer of this kind which has few parts and which may be made perfectly accurate at a reasonable cost.

With these and other objects in view, my invention consists of certain novel arrangements and combinations of parts of which the herein described caliper is an embodiment.

While I have described minute details I do not limit myself to these, as the same may be greatly varied without departing from the spirit and scope of the invention.

In the annexed drawing forming a part of this specification and in which like reference characters refer to like parts throughout the several views, Figure 1 is a side elevation of my micrometer; Fig. 2 is a longitudinal sectional view of the same, the frame being shown in elevation; Fig. 3 is a transverse sectional view taken on the line 3—3 of Fig. 2; Fig. 4 is a side elevation of the sliding bushing; Fig. 5 is a perspective view of the rack and spindle bushing; and Fig. 6 is a side elevation view of the spacing plunger.

In the drawing, which is for illustrative purposes only, and, therefore, not drawn to any particular scale, is shown a micrometer embodying my invention. The frame, 1, thereof is provided with the usual adjusting anvil, 2, and the sleeve, 3. Within the sleeve, 3, is the rack and spindle bushing, 4, which is provided with an axially disposed bore, 5, and a rectangular slot forming a rack seat, 6, in its lower face. This bushing fits closely within the inner end of the sleeve, 3, and is fastened in place in any convenient manner. On the inner end of the bushing, 4, is the reduced end, 7, provided with oppositely disposed longitudinal slots, 8. Rotatably and slidably mounted within the bore, 5, is the smooth cylindrical end, 9, of the spindle, 10. The opposite end of the spindle, 10, is provided with a screw-threaded portion, 11, at the extreme of which is fastened in any suitable manner a spacing collar, 12, upon which is securely fastened the thimble, 13, the thimble, 13, the collar, 12, and the spindle, 10, being rigidly secured together as shown.

On the inner edge of the thimble, 13, is the annular scale, 14, and on the sleeve 3, is the linear scale, 15, as is usual with micrometer calipers. Slidably mounted within the sleeve, 3, is the sliding bushing, 16, which is provided with a screw-threaded bore, 17, and a rack, 18, as shown. The rack, 18, is adapted to slide within the rack seat, 6, the teeth, 19, thereof projecting downwardly. Within the arm of the frame, 1, near the sleeve, 3, and centrally disposed thereof, is a plunger bore, 20, in which is slidably placed a spacer plunger, or pawl, 21, which is normally held in its upward position by the spring, 22, and may be forced downwardly by means of the thumb press, 23, rigidly secured in said spacer plunger and slidable in a vertical slot, 24.

The outer end of the spacer plunger, 21, is provided with a single tooth, 25, having a slanting side, 26, and a straight side, 27, as shown, which tooth is adapted to engage between the teeth, 19, of the rack, 18. In order to adjust the pressure of the reduced end, 7, of the bushing 4 on the smooth end, 9, of the spindle, 10, I provide a pressure screw, 28, in the upper part of the sleeve, 3, adapted to bear against the upper member of the reduced end, 7, formed by the slots, 8. It is obvious that by turning this screw, 28, the upper member of the reduced end, 7, may be caused to press upon the spindle 10 with any degree of pressure.

In order that there should be no lost motion between the spindle, 10, and the sliding bushing, 16, I provide a take-up nut, 29, on the screw-threaded tapered reduced end, 30, of the sliding bushing, 16. The reduced end, 30, is divided into resilient members by means of slots, 31, whereby rotation of the take-up nut, 29, may cause the end, 30, to more tightly engage the threaded portion, 11.

The graduations of the linear scale, 15, and the "annular" scale, 14, may be of any desired distance apart, but as is usual in my micrometers, I prefer that the graduations of the scale, 15, be 1/40 of an inch apart, and that the annular scale, 14, be divided into twenty-five equal parts. As is well known, the distance between the threads of the portion, 11, must be exactly the same distance apart as the distance between the graduations of the scale, 15. It will be seen that forty rotations of the thimble, 13, will cause the spindle, 10, to move exactly one inch and that one rotation of the thimble will cause the spindle to move 1/40 of an inch, and that the movement of the thimble through one degree of the annular scale, 14, will cause the spindle to move through 1/25 of 1/40 of an inch, or 1/1000 of an inch. The teeth, 19, are spaced apart exactly the same as the graduations of the scale, 15, or the threads of the portion 11, and are so disposed that when the spindle, 10, and the thimble, 13, are in position for the zero point of the scale, 14, to be exactly on the longitudinal line of the scale, 15, the plunger, 20, will exactly seat between the teeth, 19, and hold the rack, 18, and the bushing, 16, firmly against longitudinal displacement in the direction away from the anvil, 2.

The operation of my micrometer is as follows: The article to be measured is placed between the anvil 2 and the spindle, 10, the plunger 20, is lowered by means of the thumb press, 23, and the spindle, 10, together with the thimble, 13, the sliding bushing, 16, and the rack, 18, is moved toward the article to be measured until the end, 9, of the spindle is near the article to be measured. Then the plunger, 20, is allowed to engage between the teeth 19, and the thimble, 13, is rotated and the article calipered and the measurement read just as with an ordinary caliper.

It is thought that the advantages and operation of my device will be understood without further explanation.

Having thus described my invention, what I claim as new, and desire to secure by Letters-Patent, is:

1. In combination, a frame, a sliding piece adjustably secured thereto, said sliding piece being provided with a screw-threaded bore, and a spindle having a screw-threaded portion adapted to be received by said bore, the range of adjustment of said sliding piece being substantially equal to the capacity of the micrometer.

2. In combination, a U-shaped frame, having a sleeve on the outer extremity of one arm thereof, a bushing slidable in said sleeve, said bushing having a screw-threaded bore, a spindle having a screw-threaded portion adapted to be received by said bushing, a rack rigidly secured to said bushing, and means on said frame adapted to engage said rack.

3. In combination, a frame having a pair of arms, a laterally disposed sleeve on the end of one of said arms, a rack and spindle bushing rigidly secured in said sleeve and having an axially disposed bore, and a seat in the lower side thereof a sliding bushing in said sleeve and having an axially disposed screw-threaded bore and a rack rigidly secured thereto and adapted to slide within said seat, a pawl fastened to said frame and adapted to engage the teeth of said rack, a spindle having a screw-threaded portion adapted to be received by said screw-threaded bore and a smooth portion adapted to be received by said first-mentioned bore, and a thimble fastened to said spindle, said thimble being provided with a scale and said sleeve being provided with a line near said scale.

4. In combination a frame having a bore in one side thereof, a bushing slidable in said bore, said bushing having a screw threaded bore, a spindle having a screw threaded portion adapted to be received by said screw threaded bore, a rack connected to said bushing and mounted in said frame and means adapted to engage and hold said rack at any desired adjustment.

5. In combination, a U-shaped frame having an anvil at the extremity of one arm and a laterally disposed sleeve at the extremity of the other arm, a fixed bushing in the inner end of said sleeve and provided with an axially disposed smooth bore, a resilient slotted reduced extension, and a rectangular key seat extending longitudinally of the lower portion thereof, a screw adjustably mounted in the upper part of said sleeve and adapted to press against said extension, a sliding bushing in said sleeve and having an axially disposed screw-threaded bore and a screw-disposed slotted reduced end, a rack rigidly secured to said sliding bushing and passing through said seat, a spindle having a threaded portion adapted to be received by said threaded bore, a nut on said screw-threaded reduced end, a spacing collar on the outer end of said spindle, a thimble secured to said spacing collar and receiving said sleeve, said sleeve being provided with a linear scale longitudinally disposed thereof and said thimble being provided with an annular scale thereof adapted to coöperate with said linear scale, a plunger adapted to coöperate with the teeth of said rack and seated in a bore extending longitudinally of the arm of said frame which carries said sleeve, said arm being provided with a slot communicating with said bore, a thumb press rigidly secured to said plunger and slidable in said slot, and a
5 spring adapted to normally hold said plunger in engagement with said rack.

In testimony whereof I have hereunto set my hand in presence of two subscribing witnesses.

HENRY OWEN COSTELLO.

Witnesses:
WILLIAM F. COSTELLO,
JOHN F. DYER.